(12) United States Patent  
Green

(10) Patent No.: US 9,174,418 B1  
(45) Date of Patent: Nov. 3, 2015

(54) FIREPROOF THERMAL INSULATION METHOD

(71) Applicant: Distribution International Southwest, Inc., Houston, TX (US)

(72) Inventor: Andy E. Green, Flower Mound, TX (US)

(73) Assignee: DISTRIBUTION INTERNATIONAL SOUTHWEST, INC., Houston, TX (US)

( * ) Notice: Subject to any disclaimer, the term of this patent is extended or adjusted under 35 U.S.C. 154(b) by 0 days.

(21) Appl. No.: 14/609,725

(22) Filed: Jan. 30, 2015

Related U.S. Application Data

(62) Division of application No. 14/448,782, filed on Jul. 31, 2014.

(60) Provisional application No. 62/004,675, filed on May 29, 2014.

(51) Int. Cl.
    *B32B 17/06* (2006.01)
    *B32B 9/04* (2006.01)
    *B32B 17/10* (2006.01)
    *B32B 7/12* (2006.01)

(52) U.S. Cl.
    CPC .............. *B32B 17/067* (2013.01); *B32B 9/047* (2013.01); *B32B 7/12* (2013.01); *B32B 17/10* (2013.01); *B32B 2307/304* (2013.01); *B32B 2307/3065* (2013.01); *Y10T 29/49947* (2015.01)

(58) Field of Classification Search
    CPC ..................... Y10T 29/49947; B32B 2605/10; B32B 17/10; B32B 17/067; B32B 9/047; B32B 7/12; B32B 17/02; B32B 11/10; B32B 2307/306; B32B 2307/304; B32B 2307/3065; F17C 2203/0345; F17C 2203/0665

See application file for complete search history.

(56) References Cited

U.S. PATENT DOCUMENTS

| | | | |
|---|---|---|---|
| 1,721,096 A | | 7/1929 | Steffens |
| 1,860,203 A | * | 5/1932 | Rishel ........................... 138/141 |
| 2,595,835 A | | 5/1952 | Folmsbee |
| 2,933,917 A | * | 4/1960 | Sampson ........................ 52/249 |
| 3,326,141 A | | 6/1967 | Graves |
| 3,653,333 A | | 4/1972 | Taylor |
| 3,948,295 A | * | 4/1976 | Lemont et al. ................ 138/147 |
| 4,089,285 A | | 5/1978 | Okamoto et al. |
| 4,104,783 A | * | 8/1978 | Schultz et al. .................. 29/451 |

(Continued)

FOREIGN PATENT DOCUMENTS

| | | | |
|---|---|---|---|
| BE | 1006507 A3 | * | 10/1994 |
| GB | 545890 A | * | 6/1942 |

(Continued)

OTHER PUBLICATIONS

FyreWrap Railroad Tank Car Insulation & Fire Protection System, Jun. 2007.

*Primary Examiner* — Jermie Cozart
(74) *Attorney, Agent, or Firm* — Fredrikson & Byron P.A.

(57) ABSTRACT

A multi-layer fireproof insulation roll for fireproofing and thermally insulating a tank car. The multi-layer fireproof insulation roll having a first layer with fire-retardant properties, a second layer having thermal insulating properties and a first strap. The first strap securing the first layer to the tank car. A method of fireproofing and insulating a tank car. A method of making a multi-layer fireproof insulation roll.

2 Claims, 5 Drawing Sheets

(56) References Cited

U.S. PATENT DOCUMENTS

| | | | |
|---|---|---|---|
| 4,445,624 A * | 5/1984 | Gill ............................... 220/1.5 |
| 4,579,249 A | 4/1986 | Patterson et al. |
| 6,521,077 B1 * | 2/2003 | McGivern et al. ......... 156/304.1 |
| 6,953,129 B2 | 10/2005 | Delay |
| 7,963,230 B2 | 6/2011 | Simpson et al. |
| 2002/0195019 A1 | 12/2002 | Woodall |
| 2006/0228558 A1 * | 10/2006 | Berry et al. ................... 428/412 |
| 2010/0213198 A1 | 8/2010 | Brown et al. |
| 2010/0307373 A1 | 12/2010 | Kinsella et al. |
| 2011/0139032 A1 | 6/2011 | Shirvinski et al. |
| 2012/0073693 A1 | 3/2012 | Collier et al. |
| 2012/0321848 A1 * | 12/2012 | Richardson, III et al. .... 428/138 |
| 2012/0321849 A1 * | 12/2012 | Richardson, III et al. .... 428/138 |
| 2012/0321883 A1 * | 12/2012 | Richardson et al. .......... 428/341 |

FOREIGN PATENT DOCUMENTS

| | | |
|---|---|---|
| GB | 921061 A * | 7/1960 |
| WO | 2013123594 A1 | 8/2013 |

* cited by examiner

FIREPROOF THERMAL INSULATION METHOD

This application is a divisional of U.S. patent application Ser. No. 14/448,782, filed Jul. 31, 2014, which is still pending claims priority to U.S. Provisional Patent Application No. 62/004,675, filed May 29, 2014. The entire contents of these applications are incorporated herein by reference.

TECHNICAL FIELD

This disclosure generally relates to systems and methods for fireproofing and insulating tank cars.

BACKGROUND

Tank cars, such as railway tank cars, are generally large, cylindrical tubes made of metal. Such tank cars can be used for transporting flammable and thermally sensitive materials (e.g., crude oil, ethanol).

SUMMARY

In general, this disclosure relates to systems, techniques, and articles of manufacture for fireproofing and thermally insulating tankers, such as road tractor-trailer tankers and rail tank cars configured to carry liquids. In some examples, a multi-layer fireproof insulating roll is provided that includes at least one layer providing fire resistance properties and at least one additional layer providing thermal insulating properties. The multi-layer fireproof insulating roll can also include one or more embedded securing straps configured to secure the multi-layer fireproof roll to the external surface of a tanker. The layer providing fire resistance properties and the layer providing thermal insulating properties can be integrally joined, for example with adhesive bonding, stitch bonding, or the like, with the securing strap positioned between the layers. The securing strap can extend beyond the edges of the layer providing fire resistance properties and the layer providing thermal insulating properties such that an installer can grasp extending opposed ends of the securing strap and join the opposed ends together.

In use, the multi-layer fireproof insulating roll can be deployed over the top of a tanker to insulate and fireproof the tanker. For example, the multi-layer fireproof insulating roll may be positioned on the vertically elevated top surface of the tanker with opposite ends of the roll positioned on opposite sides of the tanker. The opposite ends of the roll can be dropped vertically downwards under the force of gravity such that roll is draped over the top and sides of the tanker. At this point, the ends of the multi-layer fireproof insulating roll may be hanging down freely without conforming to the underside of the tanker. Subsequently, an installer can grasp the securing strap extending beyond the edges of the layer providing fire resistance properties and the layer providing thermal insulating properties and pull the multi-layer fireproof insulating roll in contact with the underside of the tanker. The installer can then secure the opposite ends of the securing strap together, thereby holding the multi-layer fireproof insulating roll on tanker for subsequent service.

Although the multi-layer fireproof insulating roll can have a variety of different arrangements, in some examples, the roll is arranged and installed such that a layer providing fire resistance properties is positioned in contact with the external surface of the tanker such that the layer is sandwiched between the tanker and a layer providing thermal insulating properties. This arrangement can be useful so that the securing strap holds the fire resistant layer to the tanker and, for example, an adhesive bonding agent holds the thermal insulating layer to the fire resistant layer. In the event of a derailment or other incident, the fire resistant layer may be retained against the tanker more firmly than the thermal insulating layer, helping to ensure the safety and security of the tanker from an external fire.

A multi-layer fireproof insulating roll in accordance with the disclosure can be used to insulate and fireproof any suitable structures. In some applications, the roll is used to insulate and fireproof a cylindrical rail tank configured to carry flammable liquids. Examples of such flammable liquids include, but are not limited to, crude oil, refined hydrocarbons (e.g., gasoline, diesel, kerosene), alcohol (e.g., ethanol, butanol), organic solvents (e.g., ketones, aldehydes), and organic monomers or polymers.

In one example, a multi-layer fireproof insulating roll is described that includes a first layer, a second layer, and a first strap. The first layer has a first length substantially equal to a circumference of a tank car and is fire-retardant. The second layer is positioned on the first layer and bonded thereto. The second layer has a second length substantially equal to the first length of the first layer and is thermally insulating. The first strap is positioned between the first layer and the second layer and has a third length greater than the first length.

In another example, a method of fireproofing and insulating a tank car is described. The example method includes providing a multi-layer fireproof insulation roll that includes a first layer, a second layer, and a first strap. The method further includes positioning the multi-layer fireproof insulation roll on a top surface of the tank car, unrolling the multi-layer fireproof insulation roll, thereby wrapping the multi-layer fireproof insulation roll around the circumference of the tank car, and securing the multi-layer fireproof insulation roll by pulling the first strap towards a bottom of the tank car. The method specifies that the first layer has a first length substantially equal to a circumference of the tank car and is fire retardant and that the second layer is positioned on the first layer and bonded thereto and has a second length equal to the first length of the first layer and is thermally insulating. The method also states that the first strap is positioned between the first layer and the second layer and has a third length greater than the first length and the second length.

BRIEF DESCRIPTION OF DRAWINGS

The following drawings are illustrative of particular embodiments of the present invention and therefore do not limit the scope of the invention. The drawings are not necessarily to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

The disclosure is generally directed to multi-layer fireproof insulation rolls. Such rolls can be installed on tank cars or other vehicles to provide fireproofing and thermal insulation properties. In some embodiments, the multi-layer fireproof insulation roll provides a thermally insulating layer bonded to a fireproof layer with integrated securing straps. Such an arrangement can provide an integrated system for quickly and repeatably deploying over tank cars being processed.

Figure 1:
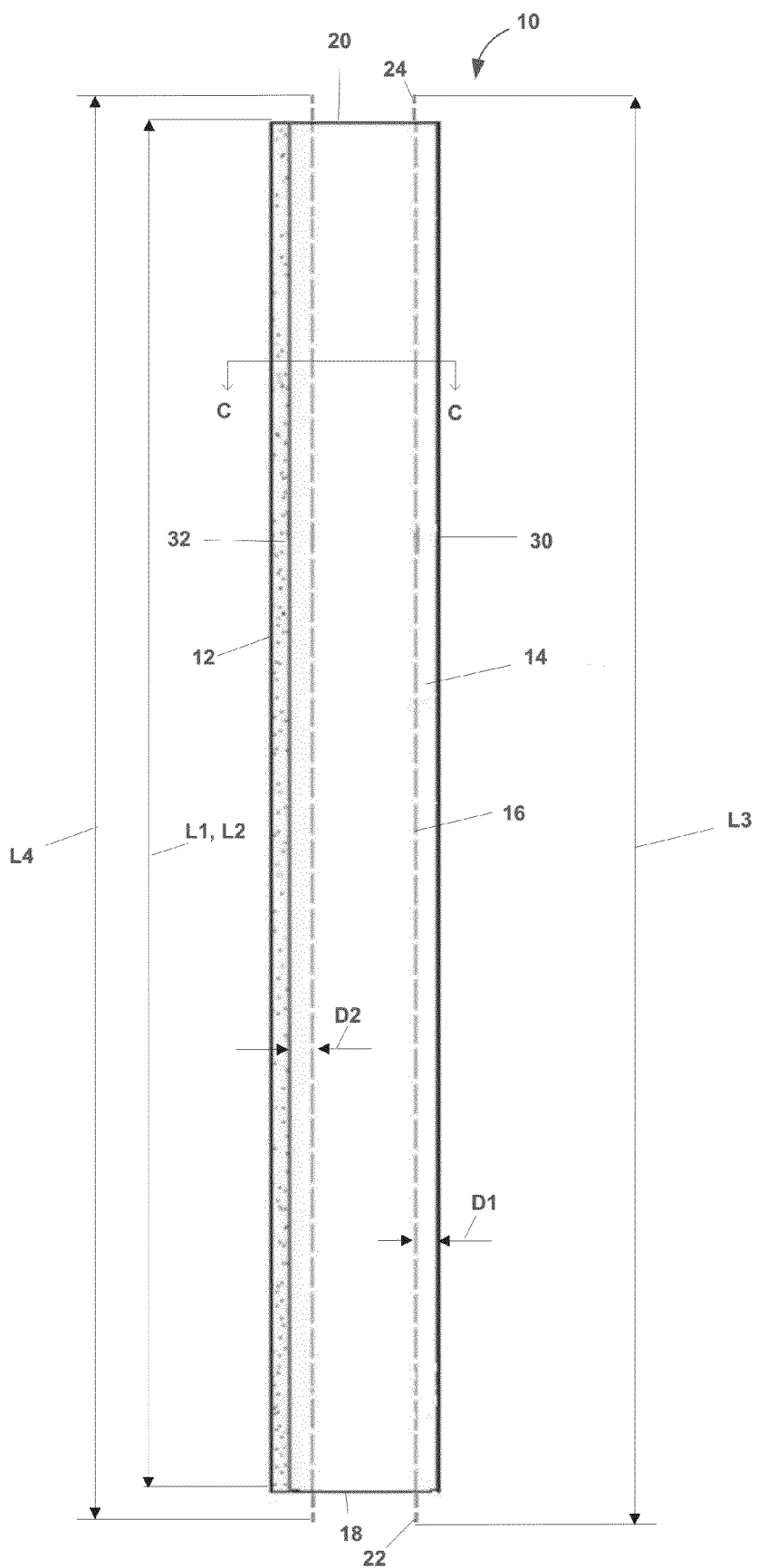
FIG. 1 is a plan view of an example multi-layer roll shown in an unrolled state.

FIG. 1 is a plan view of an example multi-layer fireproof insulation roll 10 shown in an unrolled state. The multi-layer fireproof insulation roll 10 may be wrapped around a tank car or other vehicle. In the illustrated view, the multi-layer fireproof insulation roll 10 has a rectangular shape when unrolled, although the roll can have any desired polygonal or arcuate shape and the disclosure is not limited in this respect.

Figure 2:
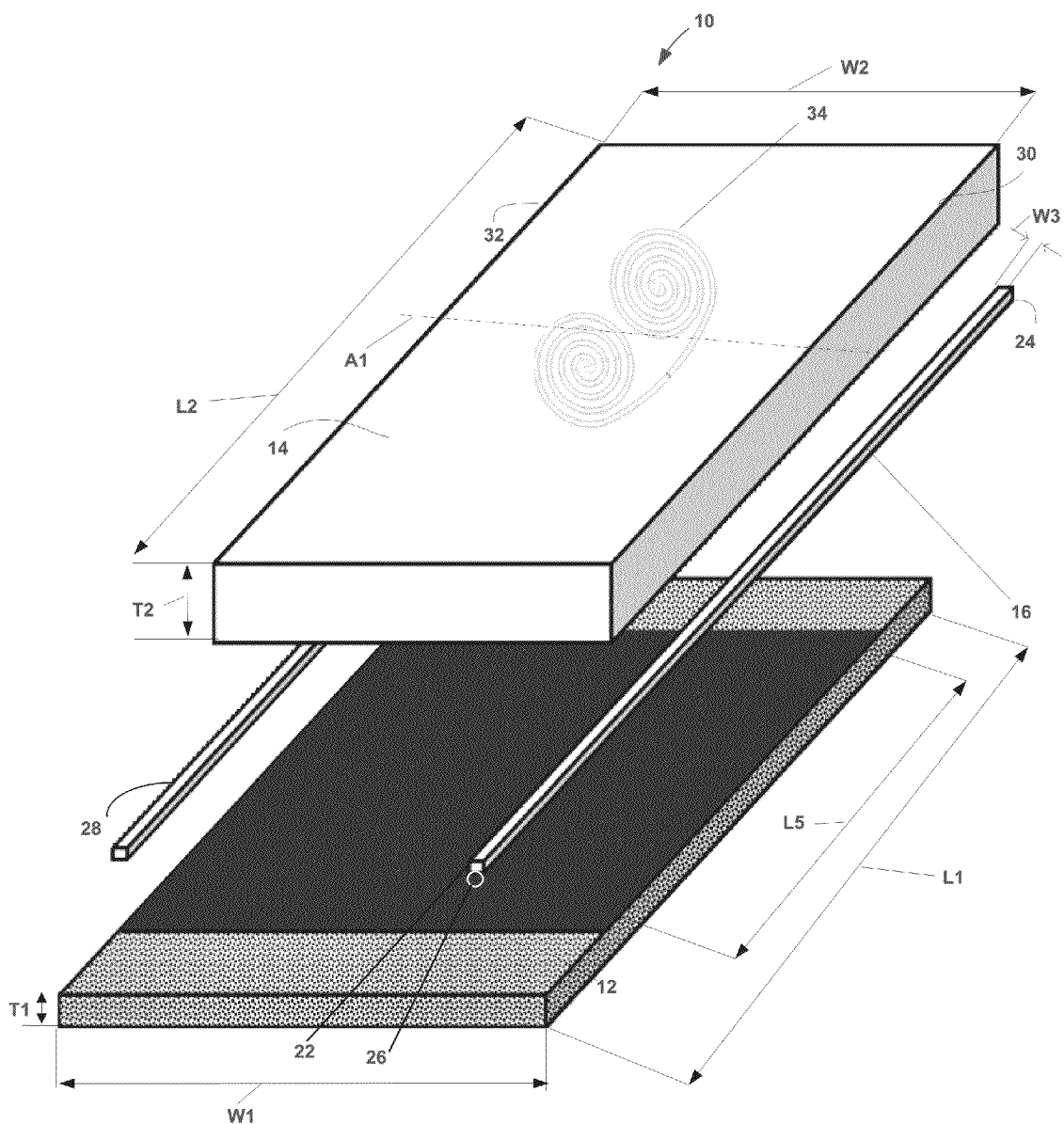
FIG. 2 is an exploded perspective view of the multi-layer roll of FIG. 1.

As shown in the exploded view of FIG. 2, the multi-layer fireproof insulation roll 10 includes a first layer 12, a second layer 14 positioned on the first layer 12 and optionally bonded thereto, and at least one strap 16 (referred to herein as "first strap 16") positioned between the first layer 12 and the second layer 14. The first layer 12, the second layer 14 and the strap may have a rectangular cross-section. In an exemplary embodiment, if the tank car is of cylindrical shape, the multi-layer fireproof insulation roll 10 can be wrapped around it such that it substantially covers a circumference of the tank car when secured.

As seen in FIGS. 1 and 2, the first layer 12 has a first length L1, the second layer 14 has a second length L2, and the first strap 16 has a third length L3. The first length L1, second length L2, and third length L3 can be measured along the elongated length of the first and second layers and the first strap. For example, the multi-layer fireproof insulation roll 10 can have a first longitudinal end 18 and a second longitudinal end 20. The first length L1 and second length L2 may extend from the first longitudinal end 18 to the second longitudinal end 20 of the multi-layer fireproof insulation roll 10. Alternatively, one of the first and second layers may be offset from the other layer (e.g., FIG. 5B) such that the layer does not extend the entire length from the first longitudinal end 18 to the second longitudinal end 20 of the multi-layer fireproof insulation roll 10.

In some examples, the first length L1 and the second length L2 are substantially equal to a circumference of a tank car (not shown in FIGS. 1 and 2). The first length L1 and second length L2 may be substantially equal to or equal to each other or may be different lengths. By contrast, the third length L3 can be greater than the first length L1 and the second length L2. Thus, when bonded, the first and second layers 12, 14 may each have an equal length with the first strap 16 extending beyond the first and second layers 12, 14 in a longitudinal direction.

With continued reference to FIGS. 1 and 2, each layer of the multi-layer fireproof insulation roll 10 can be undivided (e.g., integral and unbroken) as seen in the illustrated embodiments. For example, the first layer 12 can be undivided along the first length L1 and the second layer 14 can be undivided along the second length L2. Further, the first strap 16 can be undivided along the third length L3. In other embodiments, the various components of the multi-layer fireproof insulation roll 10 can be segmented. For example, the first layer 12 can be formed of a plurality of segments bonded to each other along the first length L1 of the first layer 12. Each segment of the first layer 12 may be characterized by a length such that when bonded, the combined length of all the segments of the first layer 12 is substantially equal to the first length L1 of the first layer 12. The second layer 14 may include a plurality of segments bonded to each other along the second length L2 of the second layer 14. Each segment of the second layer 14 may be characterized by a length such that when bonded, the combined length of all the segments of the second layer 14 is substantially equal to the second length L2 of the second layer 14. Additionally or alternatively, the first strap 16 may include a plurality of segments bonded to each other along the third length L3 of the first strap 16. Each segment of the first strap 16 may be characterized by a length such that when bonded, the combined length of all the segments of the first strap 16 is substantially equal to the third length L3 of the first strap 16.

The various components of the roll may be provided with any suitable dimensions and the dimensions can vary, e.g., depending on the size of the vessel being covered. In some examples, the first layer 12 and second layer 14 each have a length approximately equal to a circumference of a rail tank car and the first strap 16 has a length longer than the circumference of the rail tank car. For example, the third length L3 of the first strap 16 may be at least one foot longer than the first length L1 and the second length L2, such as at least 3 feet longer, or at least 5 feet longer. With further reference to FIGS. 1 and 2, for example, the first length L1 of the first layer 12 and the second length L2 of the second layer 14 may range from approximately 31 feet to approximately 34 feet. In such embodiments, the third length L3 of the first strap 16 can be longer than the first length L1 and the second length L2, such as approximately 40 feet. In general, the first, second, and third lengths L1, L2, L3 may be sufficiently long to substantially wrap around the circumference of a vehicle to be fireproofed and/or insulated.

Figure 3:
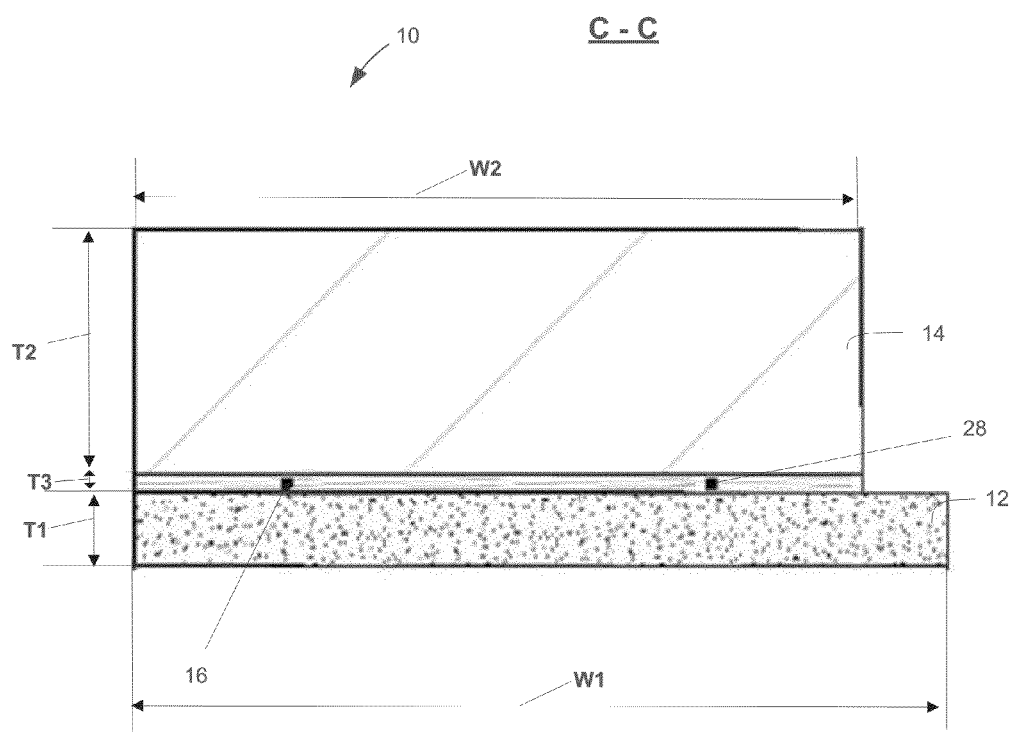
FIG. 3 is a cross-sectional view of the multi-layer roll of FIG. 1 taken along the C-C cross-section line indicated on FIG. 1.

As seen in FIGS. 2 and 3, the first layer 12 can have a first width W1. The width W1 of the first layer 12 can be about, for example, 50 inches. The second layer 14 can have a second width W2. The second width W2 of the second layer 14 can be less than the width of the first layer, such as about 10% less, or about 45 inches in some embodiments. The first strap 16 can have a third width W3. The third width W3 of the first strap 16 can be about $\frac{1}{100}$ths of the width of the first layer, or about 0.5 inches in some embodiments. As further seen in FIG. 3, the first layer 12 may have a first thickness T1. The second layer 14 may have a second thickness T2. The first thickness T1 can be about 0.5 inches. The second thickness T2 can be about 8 times thicker than the first thickness, or about four inches in this embodiment. The forgoing dimensions are merely examples though, and the disclosure is not limited in this respect.

As mentioned above, the first layer 12 can function to provide fire resistance properties while the second layer 14 can function to provide thermal insulating properties. For example, the first layer 12 may be more fire retardant (e.g., have a higher fire resistance) than the second layer 14 and the second layer 14 may be more thermally insulating than the first layer 12. The thermal insulating properties of multi-layer fireproof insulation roll 10 can help to thermally isolate the contents of a tanker vessel covered by the roll from the ambient environment. This can be useful, for example, to prevent the contents from cooling below a temperature at which the contents readily flow or to prevent the contents from heating above a temperature at which the contents vaporize and generate flammable gases. The fire resistant properties of multi-layer fireproof insulation roll 10 can help shield a tanker car covered by the roll and the contents therein from external flames, such as may occur during a derailing event or other accident.

When the first layer 12 is configured to provide fire retardant properties, the layer may have a low thermal conductivity, e.g., ranging from about 0.01 Watts per meter Kelvin ($Wm^{-1}K^{-1}$) to about 20 $Wm^{-1}K^{-1}$. The first layer 12 may exhibit fire retardant properties (e.g., low thermal conductivity, maintaining physical integrity) up to a high temperature, such as a temperature up to 2300 degrees Fahrenheit. Any materials providing suitable fire retardant properties can be used to fabricate first layer 12.

In some examples, first layer 12 is fabricated from a ceramic material (e.g., ceramic fiber). The ceramic material can be a metal oxide (e.g., alumina, beryllia, silica, magnesia, and/or zirconia), a non-oxide (e.g., carbide, nitride, silicide), or composite material (e.g., formed of combinations of oxides and nonoxides). For example, the ceramic material may be a refractory material that is chemically and physically stable at high temperatures. When used, the density of the ceramic material forming first layer 12 can be between about 4 and about 6 pounds per cubic foot, although other densities can also be used. While providing fire retardant properties, first layer 12 may be sufficiently flexible to fold over upon itself (e.g., in a roll) and bend to conform to the shape of a tank being covered.

In one example, first layer 12 is fabricated from a ceramic material that includes oxides of alumina and silica. For example, the ceramic material may include silica, alumina, and zirconia. In such an example, the alumina ($Al_2O_3$) may range from about 44 and about 50 weight percent of the ceramic, the silica ($SiO_2$) may range from about 50 and 56 weight percent of the ceramic, and the zirconia ($ZrO_2$) may range from about 13 and about 19 weight percent of the ceramic.

As mentioned, the second layer 14 can provide thermal insulation properties to the multi-layer fireproof insulation roll 10. Accordingly, the second layer 14 can be configured to have a high normalized thermal resistance (also referred to as R-value), such as an R-value ranging from a value of approximately 3.7 per inch of thickness to approximately 4.3 per inch of thickness, although other R-value materials can also be used. In some examples, second layer 14 is fabricated from a fiberglass (e.g., a material including glass fibers), such as a ¾ density fiberglass. The density of the second layer 14 may be between about 0.7 and about 0.9 pounds per cubic foot, although other densities can also be used. When using a glass fiber material, the second layer 14 may include a structural material (e.g., a polymer) reinforced by glass fibers. Example polymer structural materials that may be used include, but are not limited to, polyethylene, polyester, Teflon® (polytetrafluoroethylene), and the like.

The multi-layer fireproof insulation roll 10 also includes one or more straps (e.g., first strap 16). The straps may be fabricated from a material strong to secure and hold the multi-layer fireproof insulation roll 10 to a tank car after installation and during subsequent service. In various examples, the straps can be fabricated from a metal (e.g., steel, aluminum), plastic, or combination thereof.

As seen in FIG. 3, the second layer 14 is bonded to the first layer 12 such that the first strap 16 is positioned and bonded between the first layer 12 and the second layer 14. For example, the first layer 12 may define an inner surface facing second layer 14 and an outer surface opposite from its inner surface, and second layer may define an inner surface facing first layer 12 and an outer surface opposite from its inner surface. One or more straps (e.g., first strap 16) incorporated into the multi-layer fireproof insulation roll 10 may be positioned between first layer 12 and second layer 14, for example, in contact with the inner surface of the first layer 12 and also in contact with the inner surface of the second layer 14. The first layer 12 and second layer 14 can be bonded together (e.g., with one or more straps interposed therebetween) to form the multi-layer fireproof insulation roll 10.

In some examples, the first layer 12 and the second layer 14 are bonded together with an adhesive. The adhesive can be a polymer adhesive (e.g., an acrylic-based adhesive). The adhesive can be applied to an inner surface of first layer 12, an inner surface of second layer 14, and/or the straps and then the first and second layers pressed together.

In the example configuration of FIG. 2, adhesive is shown applied over a length L5 of the first layer 12. The length L5 can be less than the first length L1 of the first layer 12. In an exemplary embodiment, the first length L1 of the first layer 12 can be about 31 feet. In an embodiment illustrated in FIG. 2, the adhesive can be applied along the first layer 12, but for a length L5 less than about 31 feet. For instance, the adhesive can be applied over a length L5 of about 25 feet. Such embodiments may facilitate a strong bond between the first layer 12 and the second layer 14 without causing the adhesive to drip adjacent the longitudinal ends 18, 20 of the multi-layer fireproof insulation roll 10 when the first layer 12 and the second layer 14 are bonded. In exemplary embodiments illustrated in FIGS. 1 and 3, the adhesive can be applied for a width less than the first width W1 of the first layer 12. In such embodiments, the adhesive can be applied for a width equal to the second width W2 of the second layer 14. As seen in FIG. 3, the adhesive can be applied on the first layer 12 such that when bonded, the adhesive layer has a thickness of T3.

One or more straps may be provided to facilitate securing the multi-layer fireproof insulation roll 10 to a tank car. With further reference to FIGS. 1 and 2, the first strap 16 includes a first longitudinal end 22 and a second longitudinal end 24. The third length L3 of the first strap 16 can extend from the first longitudinal end 22 to the second longitudinal end 24. In such embodiments best seen in FIG. 2, at least one of the first and second longitudinal ends 22, 24 includes a loop 26 for securing the roll 10 around the tank car proximate the bottom of the tank car. Opposite end 24 may be threaded through the loop to secure the roll to the car. Such embodiments can be useful for securing the multi-layer fireproof insulation roll 10 once it is wrapped around the tank car.

As mentioned previously, the first strap 16 can be longer than the first and second layers 12, 14. Thus, when the multi-layer fireproof insulation roll 10 is positioned on a tank car in the unrolled state, the first strap 16 can be useful for wrapping the multi-layer fireproof insulation roll 10 and thereby bringing the first and second longitudinal ends 18, 20 of the multi-layer fireproof insulation roll 10 towards a bottom surface (not shown) of the tank car. Once wrapped, the loop 26 can then be used to secure the roll to the tank car, e.g., by passing a free end of the strap through the loop. Although not illustrated, a hook, a cable tie, a hook-and-loop fastener and the like may be used instead of or in addition to the loop 26 to secure the roll to the tank car.

With continued reference to FIGS. 1 and 2, the multi-layer fireproof insulation roll 10 can include a second strap 28 positioned between the first layer 12 and the second layer 14. The second strap 28 can have a fourth length L4 greater than the first length L1 of the first layer 12 and may be the same as or different than the third length L3. The second strap 28 may be positioned between the bonded first and second layers 12, 14. In such embodiments best seen in FIG. 1, the first and second straps 16, 28 can be positioned at a first transverse distance D1 and second transverse distance D2 respectively. For example, the straps can extend parallel to the longitudinal lengths L1 and L2 of the first layer 12 and second layer 14, respectively, and be offset from the side edges of the layers (towards a center of the layers).

When offset, the first and second transverse distances D1, D2 can be perpendicular to the first length L1 and/or second length L2. In some examples, the outwardly facing edges of the straps are spaced from the sides edges of the first layer 12 and second layer 14 such that first transverse distance D1 and/or second transverse distance D2 are greater than 2 inches, such as greater than 4 inches, or approximately 6 inches or greater. For example, the first transverse distance D1 can be about six inches from a first transverse edge 30 of the second layer 14 and/or the second transverse distance D2 can be about six inches from a second transverse edge 32 of the second layer 14. The first and second transverse edges 30, 32 can be opposite to each other.

In use, the first and second straps 16, 28 can secure the first layer 12 proximate an outwardly facing surface of a tank car, such as a bottom surface of the tank car. The first and second straps 16, 28 can have substantially the same or different dimensions, composition, and/or mechanical properties. In one example, for instance, the second strap can have a length of about 40 feet and a width of about 0.5 inches. The second strap can be made of plastic, and bonded between the first and second layers 12, 14.

As seen in FIG. 2, the multi-layer fireproof insulation roll 10 can include a third strap 34, e.g., positioned on the external surface of second layer 14. For instance, the third strap 34 may be loosely positioned (e.g., not bonded) on the second layer 14. The third strap 34 may be formed into a roll and positioned loosely on the second layer 14, as seen in FIG. 2. The third strap 34 may also be unrolled and positioned loosely on the second layer 14. In other embodiments, the third strap 34 may be bonded to the second layer 14. In such embodiments, a length of the third strap 34 may be greater than the length of the first layer 12 and/or second layer 14. In an exemplary embodiment, the third strap 34 has a length of about 40 feet, and a width of about 0.5 inches.

When used, the third strap 34 may be placed on the multi-layer fireproof insulation roll 10 after it is unrolled. Once the multi-layer fireproof insulation roll 10 is unwrapped, the third strap 34 may facilitate securing the roll outside of the second layer 14 proximate the bottom surface of the tank car. The third strap 34 may include a loop (not shown) formed on at least one longitudinal end through which an opposed end can be inserted for securing the roll.

Figure 4:
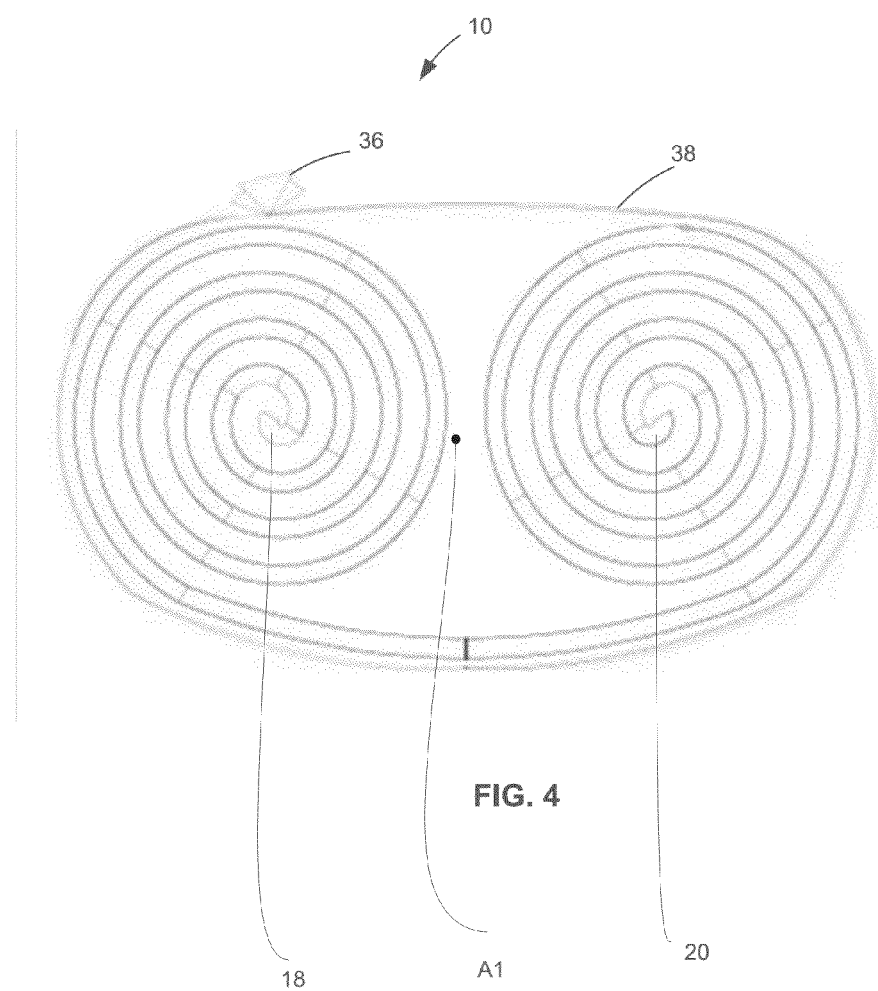
FIG. 4 is a front elevation view of the multi-layer roll of FIG. 1 shown in an example rolled state.

With reference to FIG. 4, the multi-layer fireproof insulation roll 10 can be rolled into a rolled state, e.g., to facilitate storage and transport. The multi-layer fireproof insulation roll 10 can be rolled after the first and second layers 12, 14 are bonded to each other with one or more straps positioned therebetween. The multi-layer fireproof insulation roll 10 can be rolled to the rolled state by bringing the first longitudinal end 18 and the second longitudinal end 20 of the multi-layer fireproof insulation roll 10 toward each other, e.g., such that a sheet of multi-layer fireproof insulation sheet is formed into two rolls that meet in approximately the middle of the sheet and each encompass approximately half of the sheet. For example, the first longitudinal end 18 and the second longitudinal end 20 can each be rolled toward an axis 'A1' (e.g., shown on FIG. 2) perpendicular to the first length L1 of the first layer 12. Alternatively, a multi-layer fireproof insulation roll 10 can be rolled to the rolled state by bringing one of the first longitudinal end 18 and the second longitudinal end 20 towards the other longitudinal end, thereby forming a single roll encompassing the entire sheet.

When the first longitudinal end 18 and the second longitudinal end 20 of the multi-layer fireproof insulation sheet are rolled toward each other, the resulting multi-layer fireproof insulation roll 10 may have a double-spiral shape in the rolled state substantially symmetrical with respect to a vertical plane passing through the axis A1 (FIG. 4). Depending on the rolling direction, the first layer 12 may be the outside layer of the roll and the second layer 14 the inside layer or vice versa.

Once rolled, the multi-layer fireproof insulation roll 10 may be secured by a fastener 36 (e.g., cable ties, hook and loop fastener etc.) or by forming a knot with one or more strings. This can hold the rolled structure in a rolled shape for transport or storage. In some embodiments, the multi-layer roll 10 is placed in a container 38 to facilitate transportation or storage of the multi-layer fireproof insulation roll 10. When used, the container 38 can be a bag made of a flexible polymer (e.g., polyethylene). Such embodiments can provide a water-resistant packaging of the multi-layer fireproof insulation roll and help prevent damage to the multi-layer fireproof insulation roll.

Certain embodiments of the invention may include a method of making a fireproof thermally insulating roll. The method may involve the steps of providing the first layer of first length, and placing the first layer against a flat support surface. Straps (e.g., two or more straps) of length greater than the first length and/or second length can be placed on the first layer and/or second layer at a first and second transverse distance respectively. In some embodiments, the first and second transverse distance can be about six inches from an edge of the second layer. At least one strap may include a loop coupled (e.g., tied) to one of its ends. An adhesive layer may be applied on the first layer and/or second layer for a length less than the first length and/or second length before or after the straps are placed on a layer. The second layer can be placed on the first layer such that the straps and adhesive are interposed between the first layer and the second layer.

In certain embodiments, the second layer may be provided in the form of a roll. In such embodiments, the second layer may be unrolled and positioned on the first layer with the adhesive and straps located therebetween, thereby bonding the second layer and the first layer. The bonded first and second layers may be rolled from opposite ends towards the center to form a roll. In some embodiments, the first layer will be the outside layer and the second layer will be the inside layer when the multi-layer roll is in the rolled state. In certain embodiments, two or more straps may be placed on the roll. The roll may then be secured (e.g., by fasteners, rope, etc.) and placed in a container (e.g., plastic bag).

Embodiments of the invention also include a method of fireproofing and insulating tank cars. The method may involve providing a multi-layer fireproof insulation roll, such as those described elsewhere herein, positioning the multi-layer fireproof insulation roll on a top surface of the tank car, unrolling the multi-layer fireproof insulation roll, thereby wrapping the multi-layer fireproof insulation roll around the perimeter of the tank car, and securing the multi-layer fireproof insulation roll by pulling the first strap towards a bottom of the tank car.

In some embodiments, the method may involve positioning the multi-layer fireproof insulation roll in a rolled state on the top surface of the tank car, wherein the first longitudinal end and the second longitudinal end of the multi-layer fireproof insulation roll are rolled towards each other. In certain embodiments, the first layer will be the outside layer and the second layer will be the inside layer. In some embodiments, the method may involve unrolling the multi-layer fireproof insulation roll, such that the first longitudinal end and the second longitudinal end of the multi-layer fireproof insulation roll are unrolled away from each other. As they unroll, the multi-layer fireproof insulation roll wraps around a perimeter of the tank car, with the first layer (fire retardant layer) in apposition to the tank car (e.g., in contact with the exterior-facing surface of the tank car).

In certain embodiments, gravity is the primary force used to unroll the roll from a position on top of the car. After the multi-layer fireproof insulation roll has unrolled, one or more straps may be used to secure the multi-layer fireproof insulation roll to the tank car. For instance, the first and second straps may be used to secure the first layer (e.g., via loops or hooks provided at one or more longitudinal ends of each strap). One or more straps may also be positioned on the second layer, and may be unwrapped to secure the second layer (e.g., via loops or hooks provided at one or more longitudinal ends of each strap) proximate the bottom surface of the tank car. Such a method is an efficient way to thermally insulate and fireproof a car.

Figure 5A:
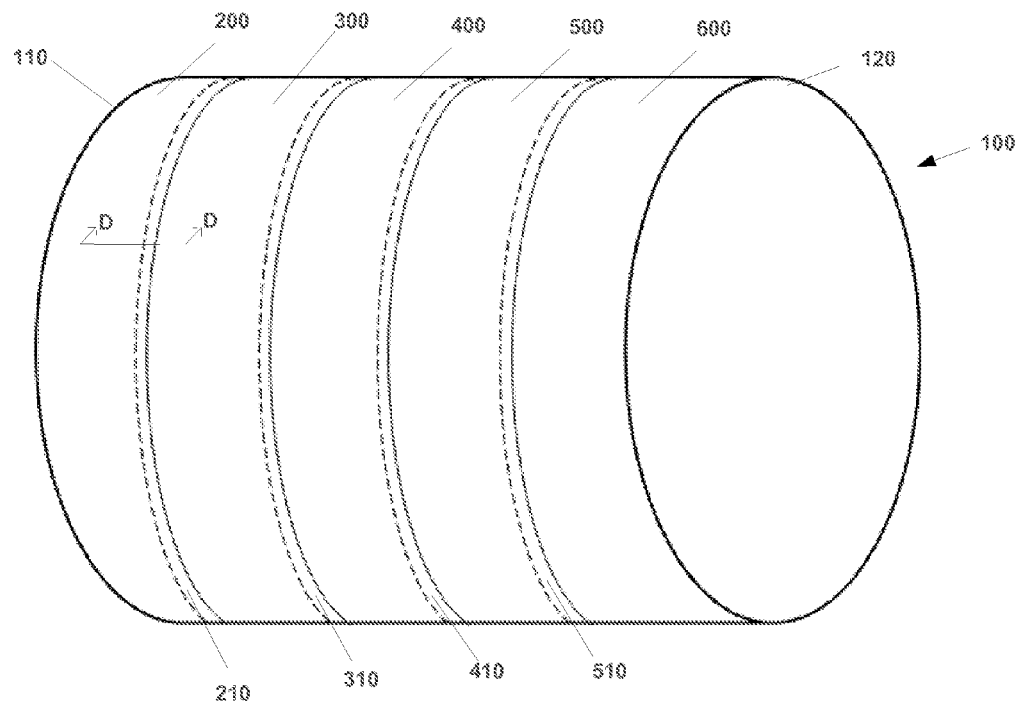
FIG. 5A is a perspective view of a tank car with multi-layer rolls applied to substantially cover the tank car according to certain embodiments.
Figure 5B:
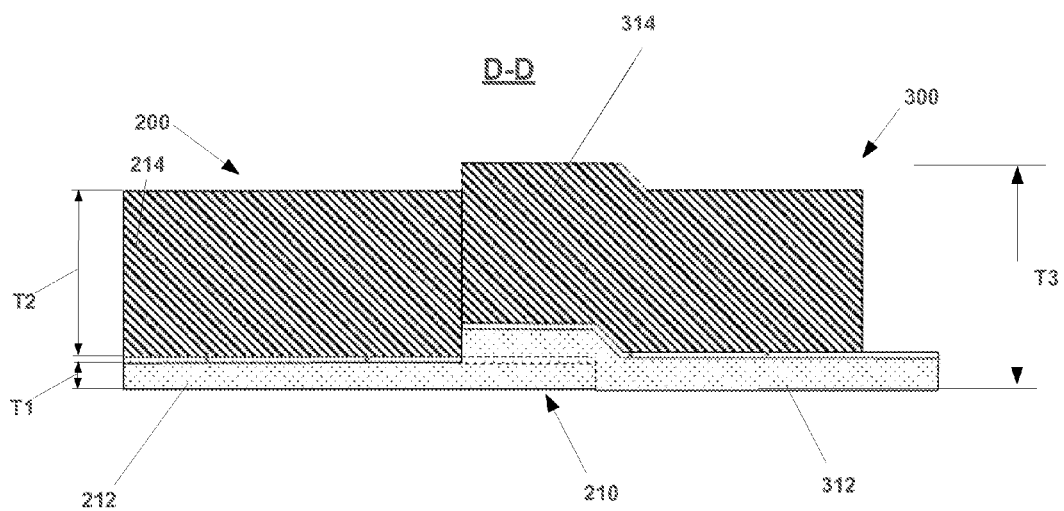
FIG. 5B is a cross-sectional view of an example arrangement of adjacent multi-layer rolls in FIG. 5A taken along the D-D cross-section line indicated on FIG. 5A.

Some embodiments include a method of sequentially applying rolls on a tank car. As illustrated in FIGS. 5A and 5B, a first roll 200 may be placed at a first end 110 of the tank car 100. The first roll 200 may be unrolled and secured proximate the bottom of the tank car 100 as described above. A second roll 300 may be positioned adjacent the first roll 200 and unrolled. Additional rolls 400, 500, 600 can then be sequentially applied on the tank car 100 progressing towards a second end 120 of the tank car 100, until the rolls 200, 300, 400, 500 and 600 substantially or fully cover the tank car 100 from the first end 110 to the second end 120. The number of rolls used will depend on the width of each roll and the overall length of the tank car.

In certain embodiments, adjacent rolls may be placed in an overlapping configuration. As described above, and as shown in FIG. 5B, the first layer may be wider than the second layer. In such embodiments, when arranged in an overlapping configuration shown in FIGS. 5A and 5B, the first layers 212, 312 of adjacent rolls 200, 300 may overlap and create an overlap region 210. The overlap region 210 may have an overlap region thickness T3. In the illustrated embodiment seen in FIG. 5B, the overlap region thickness T3 can be larger than the sum of the thickness T1 and T2 of the first and second layers 212, 214. In the embodiment shown, second layers 214, 314 are adjacent and abutting. Other configurations of arranging the layers (e.g., non-overlapping layers) are also contemplated. Adjacent rolls can be unrolled and secured to substantially cover the tank car and fireproof and insulate the tank car.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention.

The invention claimed is:

1. A method of fireproofing and insulating a tank car, comprising:
   providing a multi-layer fireproof insulation roll, comprising:
      a first layer having a first length, the first length substantially equal to a circumference of the tank car, the first layer being fire retardant,
      a second layer positioned on the first layer and bonded thereto, the second layer having a second length, the second length being equal to the first length of the first layer, the second layer being thermally insulating, and
      a first strap positioned between the first layer and the second layer, the first strap having a third length greater than the first length and the second length;
   positioning the multi-layer fireproof insulation roll on a top surface of the tank car;
   unrolling the multi-layer fireproof insulation roll, thereby wrapping the multi-layer fireproof insulation roll around the circumference of the tank car; and
   securing the multi-layer fireproof insulation roll by pulling the first strap towards a bottom of the tank car.

2. The method of claim 1, further comprising
   positioning the multi-layer fireproof insulation roll in a rolled state on the top surface of the tank car, wherein a first longitudinal end and second longitudinal end of the multi-layer fireproof insulation roll are unrolled from a center of the multi-layer fireproof insulation roll in the multi-layer fireproof insulation rolled state.

* * * * *